United States Patent [19]
Anderson et al.

[11] Patent Number: 5,917,488
[45] Date of Patent: *Jun. 29, 1999

[54] SYSTEM AND METHOD FOR DISPLAYING AND MANIPULATING IMAGE DATA SETS

[75] Inventors: Eric C. Anderson; John Y. Wang, both of San Jose; Manchuen Dino Tang, Milpitas, all of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,161

[22] Filed: Aug. 21, 1996

[51] Int. Cl.⁶ .................................................. G06F 15/00
[52] U.S. Cl. ............................................................ 345/342
[58] Field of Search ..................... 345/439, 339, 345/340, 341, 342, 343, 344, 345, 346

[56] References Cited

U.S. PATENT DOCUMENTS

| | | | |
|---|---|---|---|
| 4,974,173 | 11/1990 | Stefik et al. | 364/521 |
| 5,202,828 | 4/1993 | Vertelney et al. | 364/419 |
| 5,233,687 | 8/1993 | Henderson, Jr. et al. | 395/158 |
| 5,341,293 | 8/1994 | Vertelney et al. | 364/419.17 |
| 5,708,826 | 1/1998 | Ikeda et al. | 395/762 |

*Primary Examiner*—Phu K. Nguyen
*Attorney, Agent, or Firm*—Carr Ferrell LLP

[57] ABSTRACT

A system for displaying and manipulating image data sets includes a display device, a memory, and a processing unit. The memory includes a view management unit that generates a graphical window showing thumbnail representations of programmed groups. A method for displaying and manipulating image data sets includes the steps of generating a first graphical window showing thumbnail representations of programmed groups, generating a second graphical window showing thumbnail representations of data objects contained in a programmed group selected from the first graphical window, and invoking an application program in response to the selection of a thumbnail representation of a data object from the second graphical window.

39 Claims, 13 Drawing Sheets

SYSTEM AND METHOD FOR DISPLAYING AND MANIPULATING IMAGE DATA SETS

BACKGROUND OF THE INVENTION

1. Field of the Invention

The present invention relates generally to the field of Graphical User Interfaces, and more particularly to a system and method for displaying and manipulating data objects associated with images.

2. Description of the Background Art

Computer use continues to grow among various groups of people having little or no computer training. As a result, a computer's ease of use, or user friendliness, is of vital importance in the market place.

Whether a computer is user friendly depends, for the most part, on its user interface. The user interface is the component of a computer through which a user interacts with the computer, and in general, includes an input device, an output device, and an interface program. The input device allows a user to issue commands or provide requested information to the computer The display device provides feedback to the user, for example requests for input or the display of certain results. The interface program interprets user input and generates output upon the output device.

One early command-driven user interface included a keyboard, for the user to provide input to the computer, and a display monitor for providing output to the user. In response to a command typed by the user, the interface program would initiate the execution of the indicated applications program by the computer. For several reasons, this command-driven user interface proved not to be very user friendly, especially to users with little or no computer training. One shortcoming of the command-driven interface was the requirement that the user memorize countless commands associated with various application programs. Typically, the commands also needed to be entered in a very precise manner. For example, a deviation as slight as the presence of an extra space or the incorrect case of a letter caused the interface program to be unable to match the command with the appropriate applications program.

These problems with the command-driven interface proved very frustrating to inexperienced users. In response, software designers developed what is known as a "Graphical User Interface" (GUI). In a GUI, the display monitor presents an image containing various types of objects, each object corresponding to a user-selectable item. The user interacts with the displayed image through the use of a pointing device such as a track ball or a mouse, which controls the position of a display cursor. When the user selects an object with the pointing device, an input command associated with the selected object is executed, thus avoiding syntactic user errors.

Generally, the image associated with a GUI is based on a familiar metaphor, such that the appearance of an object suggests the input command it represents. For example, Apple Computer's (Apple Computer, Inc., Cupertino, Calif.) graphical interface appears as a desk top blotter, where an object that appears as a trash can is used to delete, or throw away, files.

Objects that may be displayed within the context of a GUI include windows, menu bars, icons, and thumbnails. A window is a rectangular portion of the interface image dedicated to a specific application program. For example, a user can edit a document with a word processing program in a window. Generally, multiple windows can be open at one time, such that a user can switch from one application to another by simply "clicking" in the window running the desired application.

Menu bars generally contain menus of related commands associated with a currently running application. For example, if the current application is a word processing program, the edit menu would typically include such objects as "cut", "copy", and "paste". If a user clicked on the object "edit" in the menu bar, the contents of the edit menu would be displayed for selection. The selection of one of the objects (cut, copy or paste) would cause the execution of the respective command.

An icon is generally a graphical object whose appearance suggests an application program with which the icon is associated. When the user clicks on an icon, the interface program generates the command necessary to begin execution of the associated application program.

A thumbnail is a graphical object that is associated with a particular document or image file. Selecting the thumbnail causes the associated document to be opened. Although similar in function, a thumbnail differs from an icon in at least one important respect. Thumbnail objects depict a portion of the actual data contained in the file they represent, whereas an icon is simply a static figure whose appearance merely suggests an associated file.

New devices and new application programs are constantly being developed, each with its own unique advantages and characteristics. As a result, new interfaces are needed so that users with little or no computer training can take advantage of the benefits offered by such developments. As these devices and applications become more complex, the need for a user friendly interface becomes even greater. The recent development of digital cameras, such as the Apple Quick Take 150, is one example of a new device requiring a computer user interface. Digital cameras capture an optical image by converting it into a digital image data set, and then storing the image data set in the digital camera's electronic memory. Digital cameras can record and store at least two image types, namely, "stills" and "groups." Stills contain a single image data set, and are analogous to a conventional photograph. Groups contain multiple image data sets that bear some relationship to one another. If the image data sets in a group have a temporal, spatial, or some other physical relationship, then the group is called a natural group. Natural groups are analogous to movies or time lapse photography, where successive images have a specific time relationship. Other examples of natural groups include panoramic groups and depth of field groups. A panoramic group contains individual images of adjacent subject matter, which can then be "stitched" together to form a coherent panoramic scene. A depth of field group contains images of the same subject, but with varied depths of field. The individual images can then be combined to produce a single image, wherein the foreground, the subject, and the background are all in focus.

After the image data sets are recorded by a camera, they can be stored for some finite amount of time in the digital camera's electronic memory, but they must eventually be transferred to a nonvolatile data storage device. Typically, the transfer, display, and editing of the collected image data sets are accomplished by connecting the digital camera to a computer system such that the camera's memory can be accessed.

Unfortunately, in the prior art, a user-friendly interface that provides for the display and manipulation of image data sets, whether stored upon a camera or a nonvolatile data storage device, does not exist. What is needed is a system and method for providing a user-friendly interface for displaying and manipulating image data sets.

SUMMARY OF THE INVENTION

The present invention is a system and method for graphically displaying, manipulating, and editing image data sets. The system of the present invention preferably comprises a nonvolatile data storage device, a processing unit, a display device, a camera, an input device, and a memory, each of which is coupled to a common system bus. The memory preferably comprises an operating system, a media panel unit, a viewer panel unit, and a viewer list memory, each of which communicates with the system bus via a memory bus.

In the present invention, an image data set is preferably either a still image, comprising a single image such as a digital photograph; a natural group, comprising a set of images associated by a temporal, spatial, or some physical relationship; or a programmed group, comprising a set of image data sets associated by a user-defined criterion. Programmed groups may comprise any combination of image data set types, including natural groups and other programmed groups. Other types of image data sets are possible as well, for example, sound clips or textual data associated with an image. Image data sets are preferably stored upon or within an image data set source. Herein, an image data set source can be a device, such as the nonvolatile data storage device or the camera, or a data file stored upon a device.

The viewer panel unit examines an image data set source and generates a viewer list. The viewer list includes a viewer list element for each top-level image data set within the image data set source, that is, for each image data set that does not reside within another image data set source. Each viewer list element comprises a first data field for storing a thumbnail; a second data field for storing a reference to actual data corresponding to an image or a set of images; and a third data field for storing a reference to a next viewer list element.

After generating the viewer list, the viewer panel unit sorts the viewer list, and generates a graphical window in which each viewer list element is graphically represented by a thumbnail and optionally a thumbnail background, uniquely representing the image data set type (media type). Thus, a still is graphically represented by a still thumbnail background; a natural group is graphically represented by a natural group thumbnail background; and a programmed group is graphically represented by a programmed group thumbnail background. Further, since there are multiple natural group media types (e.g. movie, time lapse, or panoramic), there are also multiple corresponding natural group thumbnail backgrounds, each uniquely indicative of a particular natural group media type. For natural and programmed groups, the thumbnail image can be based on a predetermined image data set from the group (i.e. the first image) or, alternatively, the thumbnail image can be based on a user selected data set from the group.

In response to user-selection of a thumbnail type other than a programmed group thumbnail, such as a still thumbnail or natural group thumbnail, the viewer panel unit initiates the execution of an application program that facilitates viewing and editing of the image or images corresponding to the selected thumbnail. Preferably, such application programs comprise the media panel unit. In response to user-selection of a programmed group thumbnail, the viewer panel unit generates another viewer list having a viewer list element for each image data set within the programmed group corresponding to the selected programmed group thumbnail. The viewer panel unit then generates another viewer window using the newly-generated viewer list, graphically displaying the thumbnails within the newly-generated viewer list according to different thumbnail types in the manner previously described. Thus, user-selection of a programmed group thumbnail results in the generation of a window that graphically indicates the contents of the programmed group that the selected programmed group thumbnail represents.

Programmed groups may be nested within any given programmed group. Thus, in the preferred embodiment, the viewer panel unit generates a viewer list and a corresponding viewer window in response to user-selection of a programmed group thumbnail, for any level of programmed group nesting considered. The present invention thus provides a user-friendly graphical user interface for manipulating and editing image data sets, automatically showing relationships between nested image data sets.

DETAILED DESCRIPTION OF A PREFERRED EMBODIMENT

A user friendly method for displaying and manipulating image data sets and a system for carrying out the same is disclosed. The following description specifies numerous details such as the organization of thumbnails within viewer windows and the organization of certain data lists. It will, however, be understood by those skilled in the art that the present invention may be practiced apart from these specific details. In other instances, to avoid unnecessarily obscuring the invention, details of well-known computer programming methods are omitted.

Figure 1:
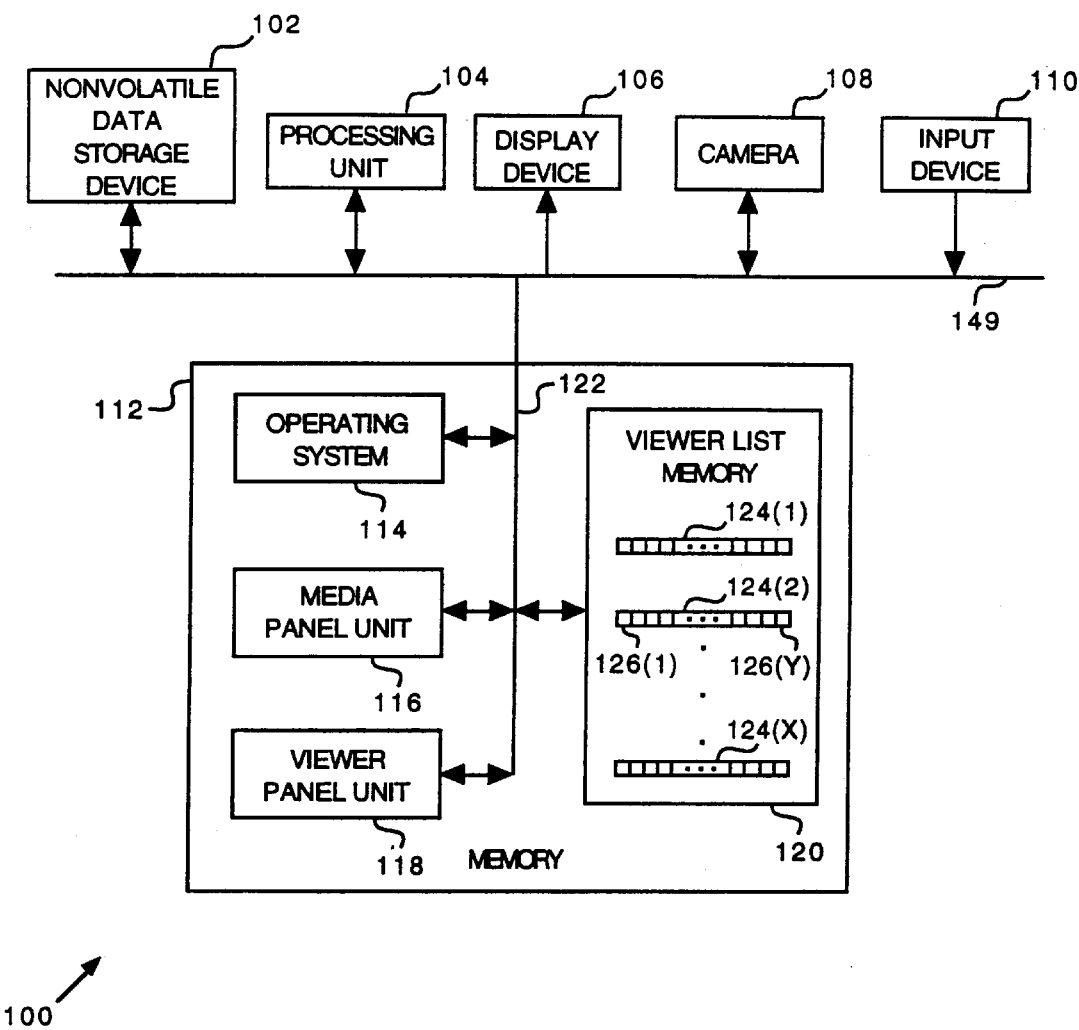
FIG. 1 is a block diagram of a preferred system for displaying and manipulating image data sets constructed in accordance with the present invention.

Referring now to FIG. 1, a block diagram of a preferred embodiment of a system 100 for displaying and manipulating image data sets constructed in accordance with the present invention is shown. The system 100 comprises a nonvolatile data storage device 102, a processing unit 104, a display or output device 106, a camera 108, an input device 110, and a memory 112, each of which communicates via a system bus 149. The memory 112 preferably comprises an operating system 114, a media panel unit 116, a viewer panel unit 118, and a viewer list memory 120, each of which communicates with the system bus 149 via a memory bus 122.

In an exemplary embodiment, the system 100 is an Apple QuickTake™ 150 camera (Apple Computer, Inc., Cupertino, Calif.) coupled to an Apple Power Macintosh™ computer having a Motorola R603 CPU (Motorola Inc., Schaumburg, Ill.), a keyboard and a mouse-type controller, a color graphics monitor, 8 Mb of Random Access Memory (RAM), a 230 Mb or larger hard disk drive and/or a CD-ROM drive, System 7.5 or later-version system software, and the viewer panel unit 118 and media panel unit 116 of the present invention. Those skilled in the art will recognize that the teachings of the present invention are applicable to essentially any graphical computing environment, such as that provided by any version of Microsoft Windows™ (Microsoft Corp., Redmond, Wash.).

In the preferred embodiment, both the nonvolatile data storage device 102 and the camera 108 serve as sources for image data sets. In the present invention, an image data set is defined as a collection of data associated with or corresponding to one or more images. Herein, at least three types of image data sets are considered. A first type of image data set is that of a still image, referred to herein as a "still." A still comprises image data corresponding to a single picture, such as a digital photograph. A second type of image data set is a "natural group," which comprises a set of images associated temporally, spatially, or based on some other physical relationship. An example of a natural group is a movie. Finally, a third type of image data set is a "programmed group." A programmed group comprises a set of image data sets associated by some user defined criterion. Thus, a programmed group can include one or more stills, one or more natural groups, and/or one or more other programmed groups. As an example of a programmed group, an insurance claims adjuster may take a number of photographs at each of several claimants homes. The set of images associated with any particular claimant could be defined as a programmed group. In the preferred embodiment, a programmed group may also comprise data such as text or a sound clip that is associated with an image. The teachings of the present invention are not limited to the types of image data sets described above; rather, the present invention is applicable to any collection of data associated with one or more images.

In the preferred embodiment, the operating system 114 provides a system-level Graphical User Interface (GUI) that serves as a means for selectively invoking the operation of the media panel unit 116 and the viewer panel unit 118. The operating system 114 preferably comprises a sequence of program instructions stored in the memory 112 and executable by the processing unit 104.

Figure 2:
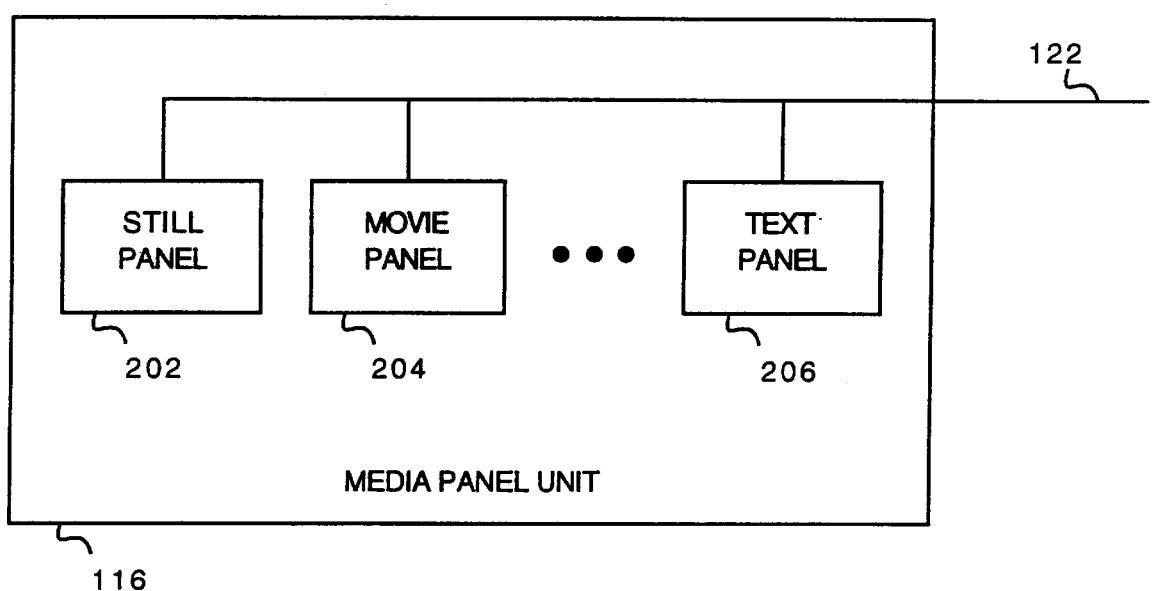
FIG. 2 is a block diagram detailing the media panel unit of FIG. 1.

Referring now to FIG. 2, a block diagram of a preferred embodiment of the media panel unit 116 is shown. The media panel unit 116 comprises a still panel 202, a movie panel 204, and a text panel 206, each of which is coupled to the memory bus 122. Herein, each of the still panel 202, the movie panel 204, and the text panel 206 comprises a sequence of program instructions executable by the processing unit 104 and forming a portion of an application program Thus, the still panel 202 comprises program instructions for viewing and editing stills; the movie panel 204 comprises program instructions for viewing and editing movies; and the text panel 206 comprises program instructions for viewing and editing text.

While the preferred embodiment is shown incorporating the still panel 202, the movie panel 204, and the text panel 206, those skilled in the art will understand that the media panel unit 116 may comprise other program instruction sequences, depending on the type of data sets desired to be included within a programmed or natural group, without departing from the spirit and scope of the invention. For example, if a programmed group includes a sound clip data set, a sound player application would preferably form a portion of the media panel unit 116.

Further, combinational type data sets can be formed by, for example, combining sound clips with movie clips to produce sound movie clips. It is conceivable that two or more of any known media types could be combined to form a new combinational media type, and such combinations are considered to be within the scope of the invention. The resulting combinational media type would require that the media panel unit contain program instruction sequences to display and/or manipulate the combinational data set.

The viewer panel unit 118 graphically manages the display and manipulation of image data sets. Referring again to FIG. 1, the viewer panel unit 118 creates and maintains one or more viewer lists 124 within the viewer list memory 120. Each viewer list 124 preferably comprises a set of viewer list elements 126 that form a linked list.

Figure 3:
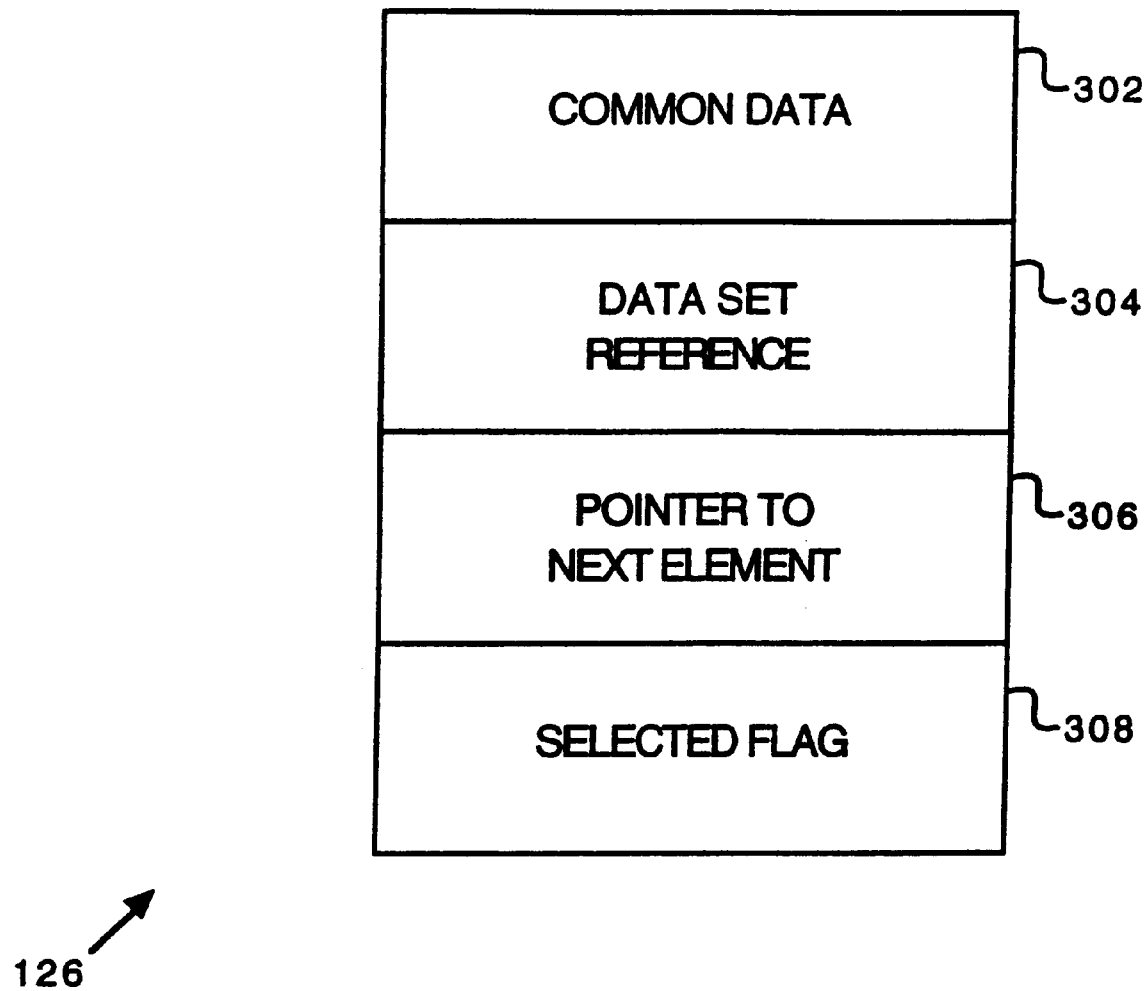
FIG. 3 is a block diagram illustrating a viewer list element of FIG. 1.

Referring now to FIG. 3, a block diagram of a preferred embodiment of a viewer list element 126 is shown. Each viewer list element 126 comprises a first data field 302 for storing common data; a second data field 304 for storing a reference to an image data set; a third data field 306 for storing a pointer to a next viewer list element 126; and a fourth data field 308 for storing a "selected" flag.

In the preferred embodiment, each viewer list element 126 corresponds to a particular image data set, that is, a still, a natural group, or a programmed group, stored either within the camera 108 or upon the nonvolatile data storage device 102. Within each viewer list element 126, the common data stored within the first data field 302 preferably includes a thumbnail image, a data set name, an origin date, a data set size, and a media type. The thumbnail image comprises a subset of the actual data within the image data set associated with the viewer list element 126. The media type indicates the particular type of image data set to which the viewer list element 126 corresponds. The image data set reference stored within the second data field 304 comprises the storage location of the image data set corresponding to the viewer list element 126. Finally, the selection flag stored within the fourth data field 308 preferably indicates whether the viewer list element 126 has been selected for manipulation, such as for a copy or move operation.

Figure 4A:
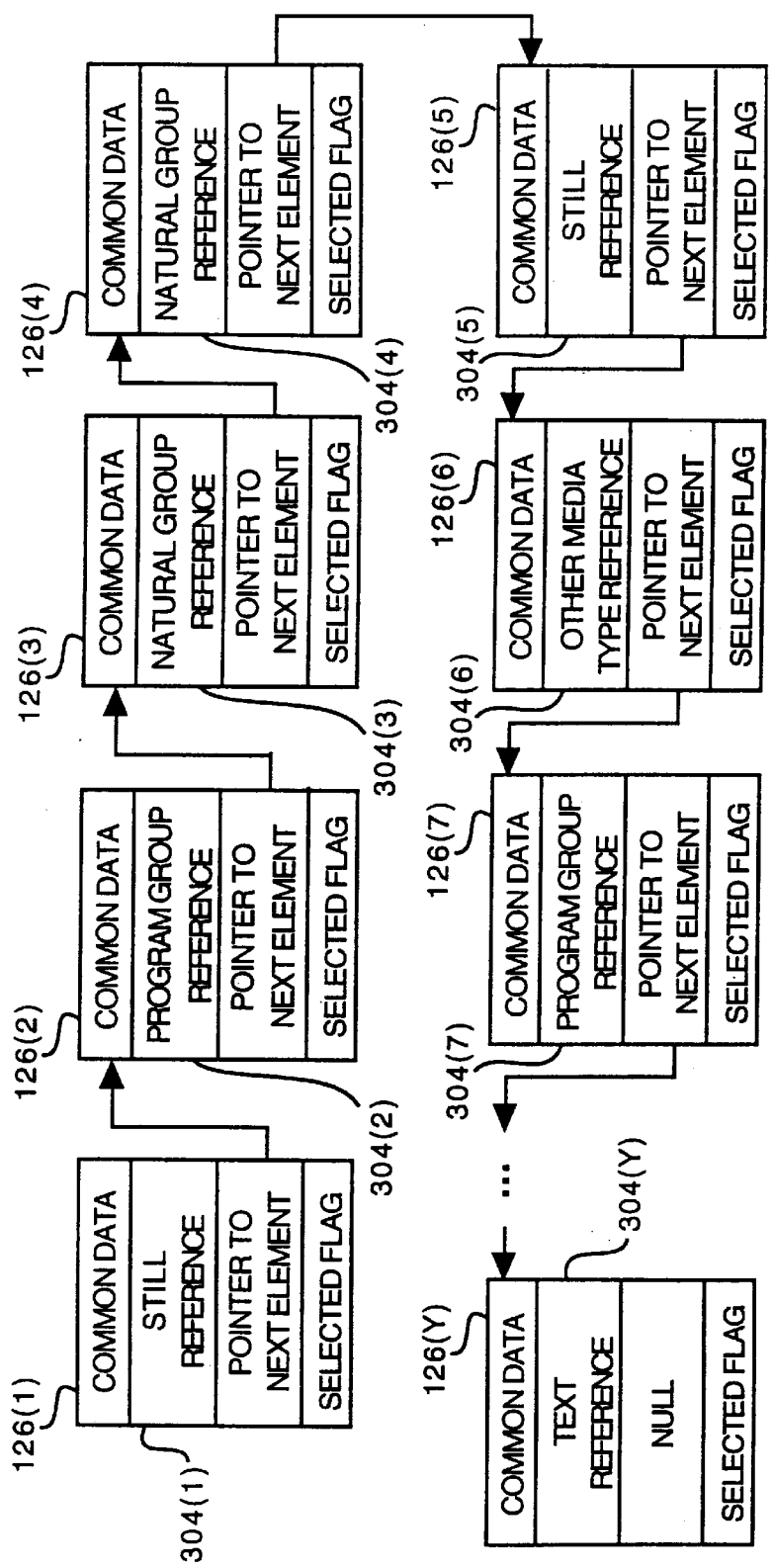
FIG. 4A is a block diagram illustrating an unsorted viewer list of FIG. 1.

In the preferred embodiment, each viewer list 124 indicates either 1) a top-level collection of image data sets stored within a graphically-selected device or data file, where the device is preferably the camera 108 or the nonvolatile data storage device 102; or 2) those image data sets that comprise a graphically-selected programmed group. Referring now to FIG. 4A, a block diagram of a preferred embodiment of an unsorted viewer list 124 is shown. The viewer list 124 shown in FIG. 4A comprises viewer list elements 126(1) through 126(Y).

Viewer list elements 126(1) through 126(Y) correspond to data sets stored upon a selected data source. One or more of these image data sets may be of a different media type. For example, the image data set references 304(1), 304(2), 304(3), 304(6), and 304(Y) could refer to a still, a programmed group, a natural group, some other media type, and a text data set, respectively. Those skilled in the art will understand that the other media type could be any data set type that might be advantageously included within a programmed group, such as a sound clip.

Figure 4B:
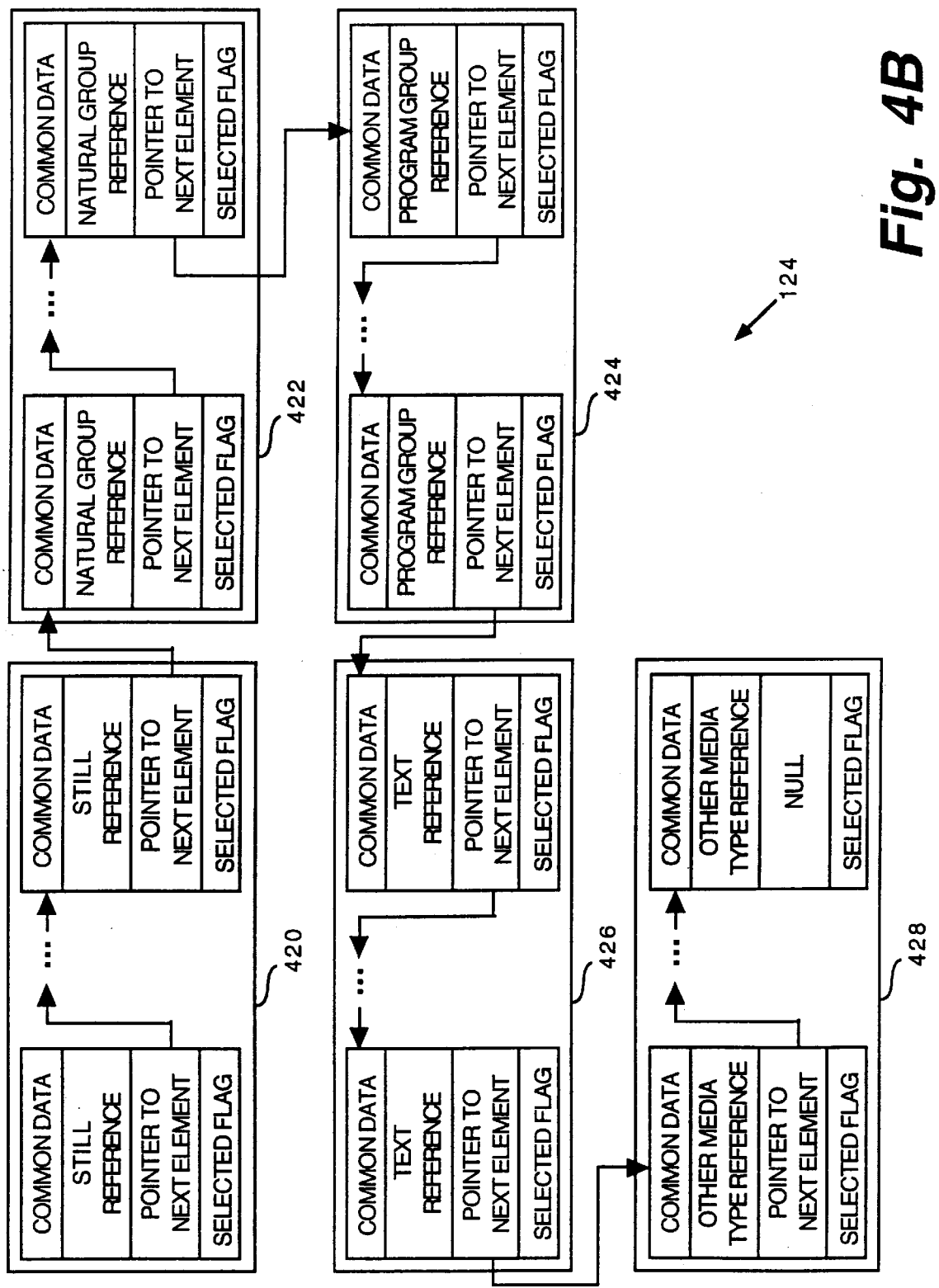
FIG. 4B is a block diagram of illustrating a sorted viewer list of FIG. 1.

In the preferred embodiment, the viewer panel unit 118 sorts a viewer list 124 into sublists in response to user-specified sort criteria. Referring now to FIG. 4B, a block diagram of an exemplary embodiment of a sorted viewer list 124 is shown. For the exemplary sorted viewer list 124, a sort criterion based upon media type is considered for purpose of example. The exemplary sorted viewer list 124 includes a still sublist 420 that contains each viewer list element 126 corresponding to a still; a natural group sublist 422 containing each viewer list element 126 corresponding to a natural group; a programmed group sublist 424 containing each viewer list element 126 corresponding to a programmed group; a text sublist 426 that indicates each viewer list element 126 corresponding to a text data set; and another media sublist 428 that contains each element 126 within the viewer list 124 that corresponds to some other media type. The other media type contained within media sublist 428 could correspond to a sound data set or a spreadsheet data set. Those skilled in the art will recognize that the viewer list 124 could also be sorted according to any criterion within the common data stored in each viewer list element 126, such as image data set name, size, or origination date.

Figure 5:
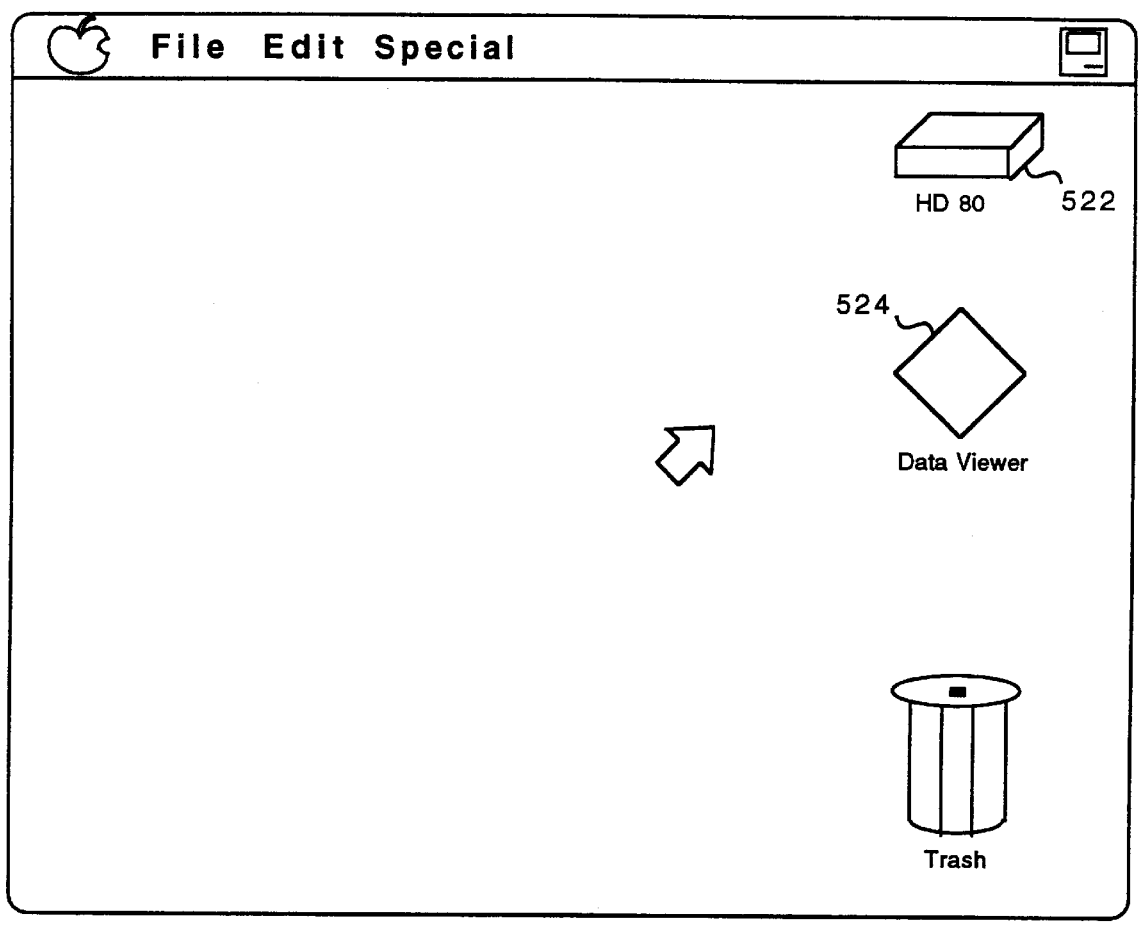
FIG. 5 is a graphical representation of an exemplary Graphical User Interface provided by the present invention.

As previously indicated, the operating system 114 provides a system-level GUI that selectively invokes the viewer panel unit 118 in response to user-selection via the input device 110. Referring now to FIG. 5, a graphical representation of an exemplary Graphical User Interface 500 provided by the present invention is shown. In the exemplary GUI 500, the nonvolatile data storage device 102 is represented by a hard disk icon 522, and the viewer panel unit 118 is represented by a viewer icon 524. User selection of the viewer icon 524 invokes the viewer panel unit 118 in a conventional manner. Those skilled in the art will recognize that the exemplary GUI 500 shown in FIG. 5 corresponds to that used in Apple Macintosh™ computers. Those skilled in the art will additionally recognize that the present invention is applicable to any graphical computing environment, such as that provided by Microsoft Windows™.

In response to user-selection of the viewer icon 524, the viewer panel unit 118 determines a device or file to use as an image data set source, from which a viewer list 124 is to be generated. Preferably, the viewer panel unit 118 determines the image data set source in response to a user-selection received via the input device 110. In the absence of user-selection of an image data set source, the viewer panel unit 118 uses the nonvolatile data storage device 102 as a default source. The viewer panel unit 118 next scans the selected image data set source, and generates a corresponding viewer list 124. In the preferred embodiment, the viewer list 124 generated from the selected image data set source includes a viewer list element 126 for each still, each natural group, and each programmed group that is not embedded within a lower-level image data set source. In the generation of the viewer list 124, the viewer panel unit 118 generates a thumbnail for each viewer list element 126 in the event that one does not already exist.

Figure 6:
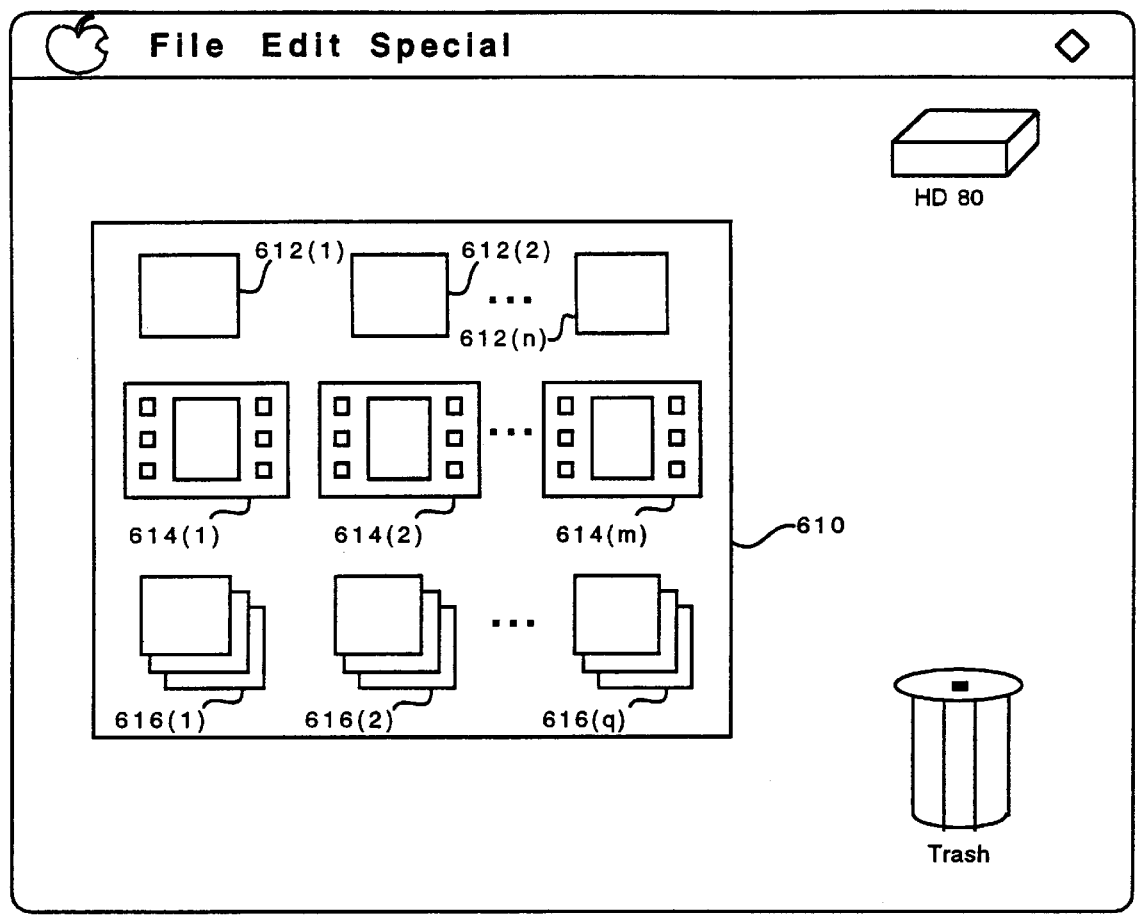
FIG. 6 is a graphical representation of a first viewer window provided by the present invention.

The viewer panel unit 118 next generates a viewer window upon the display device 106, in which each element of the currently-considered viewer list 124 is graphically represented according to media type. Referring now to FIG. 6, a graphical representation of a first viewer window 610 is shown. In the generation of the first viewer window 610, the viewer panel unit 118 generates or draws the thumbnail associated with each element within the currently-considered viewer list 124. In the preferred embodiment, thumbnails associated with each different media type are presented or displayed with unique graphical elements or, optionally, with unique icons. When generating the first viewer window 610, the viewer panel unit 118 preferably graphically groups the thumbnails associated with each sorted sublist within the viewer list 124. As shown in FIG. 6, for the currently-considered viewer list 124, a set of still thumbnails 612(1), 612(2), through 612(n) correspond to stills referenced by the viewer list 124; a set of natural group thumbnails 614(1), 614(2), through 614(m) correspond to natural groups referenced by the viewer list 124; and a set of programmed group thumbnails 616(1), 616(2), through 616(q) correspond to programmed groups referenced by the viewer list 124. An analogous group of thumbnails would be present for each other media type present within the currently-considered viewer list 124.

In the preferred embodiment, the viewer panel unit 118 selectively generates a unique background or frame within which a thumbnail associated with a given media type is drawn. For example, as shown in FIG. 6, natural group thumbnails 614(1), 614(2), through 614(m) have a frame or border indicative of movie film. As another example, programmed group thumbnails 616(1), 616(2), through 616(q) corresponding to programmed groups are drawn in a manner indicative of a "tiled" window. Those skilled in the art will recognize that many variations are possible for graphically differentiating thumbnails according to media type.

Figure 7:
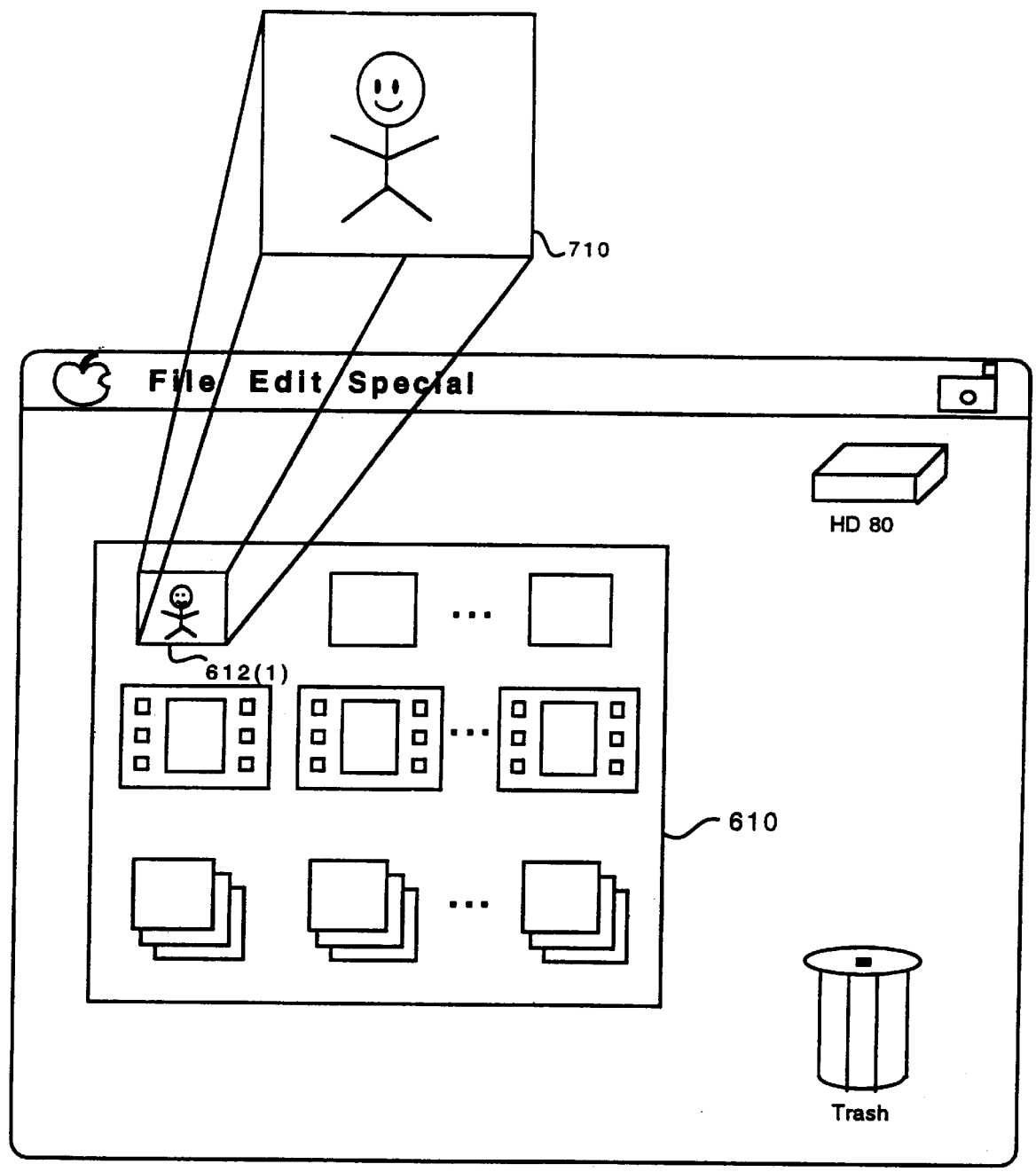
FIG. 7 is a graphical representation of a still panel window provided by the present invention.

In response to user-selection of a still thumbnail or natural group thumbnail, the viewer panel unit 118 initiates the execution of program instructions within the media panel unit 116 according to the media type of the selected thumbnail. Thus, in response to user-selection of a still thumbnail, the viewer panel unit 118 initiates the execution of the still panel 202. In the preferred embodiment, the still panel 202 generates a still panel window 710 that provides for viewing and editing the image data set with which the thumbnail is associated. Referring now to FIG. 7, a graphical representation of a still panel window provided by the present invention is shown. When the still panel window 710 is closed, control preferably returns to the viewer panel unit 118, within the context of the viewer window from which the most-recent thumbnail selection occurred.

Figure 8:
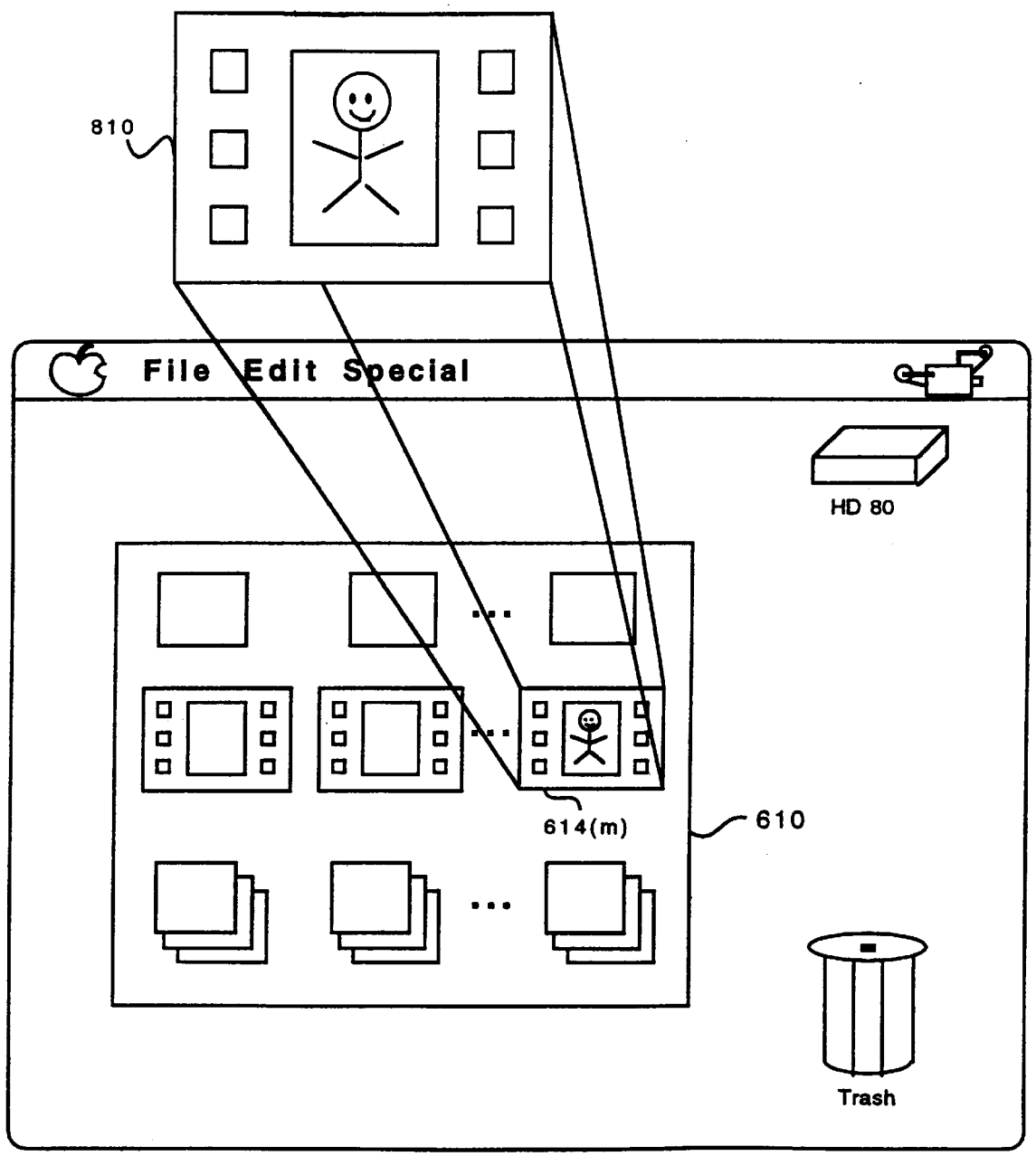
FIG. 8 is a graphical representation of a movie panel window provided by the present invention.

In response to user-selection of a natural group (e.g. movie) thumbnail, the viewer panel unit 118 preferably initiates the execution of the movie panel 204. The movie panel 204 generates a movie panel window 810 that provides for viewing and editing the natural group associated with the selected thumbnail. Referring now to FIG. 8, a graphical representation of a movie panel window 810 provided by the present invention is shown. Once the movie panel window 810 is closed, control preferably returns to the viewer panel unit 118, within the context of the viewer window from which the most recent thumbnail selection occurred.

In response to a user-selection of a particular programmed group thumbnail, which in the present invention is the graphical equivalent of user selection of the corresponding programmed group, the viewer panel unit 118 determines the image data sets that comprise this selected programmed group. The viewer panel unit 118 generates a viewer list 124 containing a viewer list element 126 for each image data set comprising the selected programmed group. The viewer panel unit 118 subsequently generates another viewer window showing still thumbnails, natural group thumbnails, and programmed group thumbnails corresponding to the stills, the natural groups, and the programmed groups that respectively comprise the selected programmed group.

Figure 9:
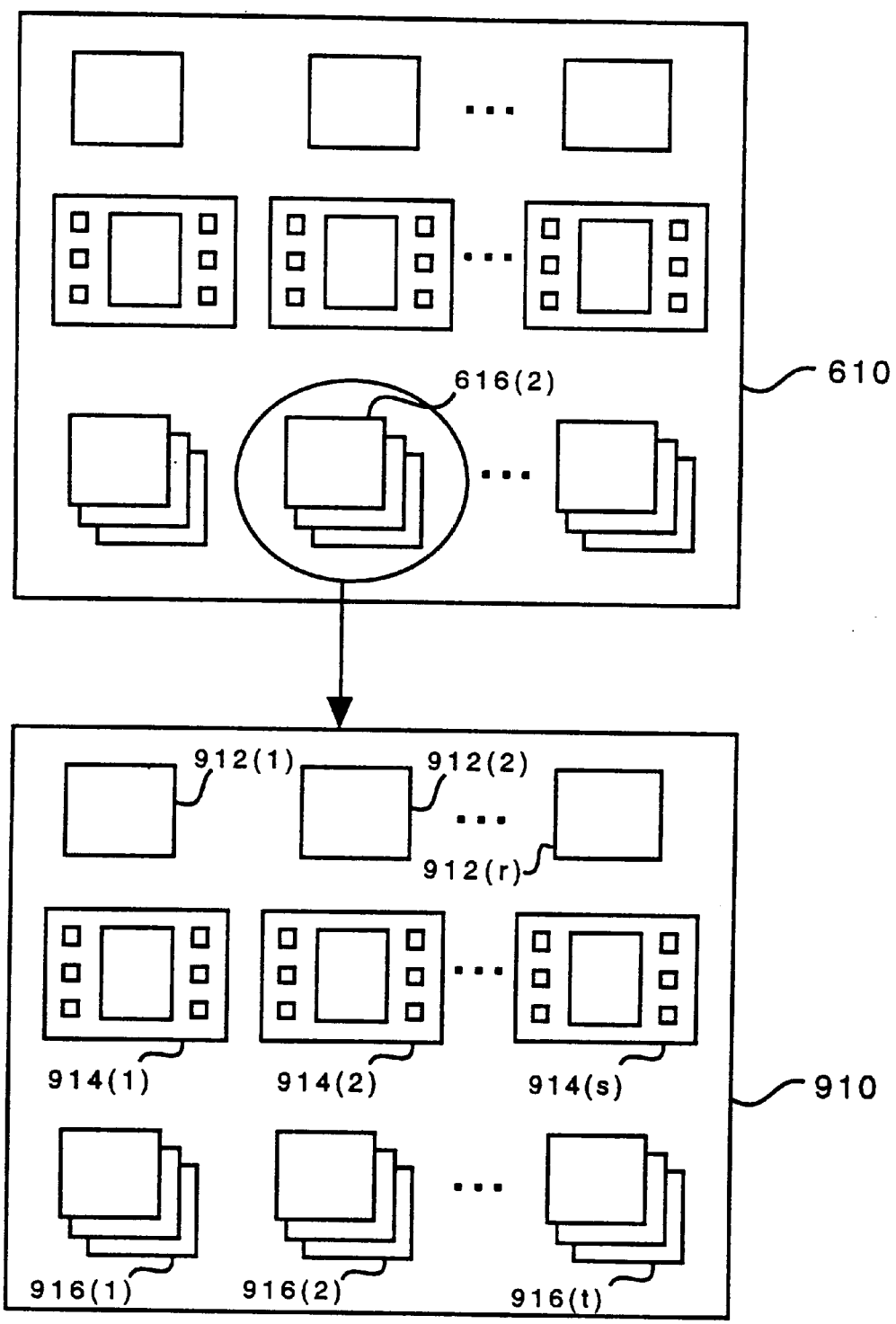
FIG. 9 is a graphical representation of a second viewer window generated in response to a user selecting a programmed group from the first viewer window of FIG. 6.

Referring now to FIG. 9, a graphical representation of a second viewer window 910 generated in response to selection of a programmed group thumbnail within the first viewer window of FIG. 6 is shown. The second viewer window 910 is generated in response to user-selection of programmed group thumbnail 612(2) of FIG. 6, and comprises still thumbnails 912(1) through 912(r), natural group thumbnails 914(1) through 914(s), and programmed group thumbnails 916(1) through 916(t).

As with the first viewer window 610, in response to user selection of a still thumbnail or natural group thumbnail within the second viewer window 910, the viewer panel unit 118 invokes the appropriate application program or application-specific program instructions within the media panel unit 116. In response to selection of a programmed group thumbnail within the second viewer window 910, the viewer panel unit 118 generates another viewer list 124 and another viewer window in a manner analogous to that described above.

The number of successive viewer windows that the viewer panel unit 118 can generate depends upon the level of nesting of programmed groups within programmed groups in the organization of the image data sets. As long as new viewer windows contain additional programmed groups, those programmed groups may be selected and additional viewer windows generated as described above. In the preferred embodiment, the viewer panel unit 118 comprises a sequence of program instructions stored in the memory 112 and executable by the processing unit 104.

Figure 10:
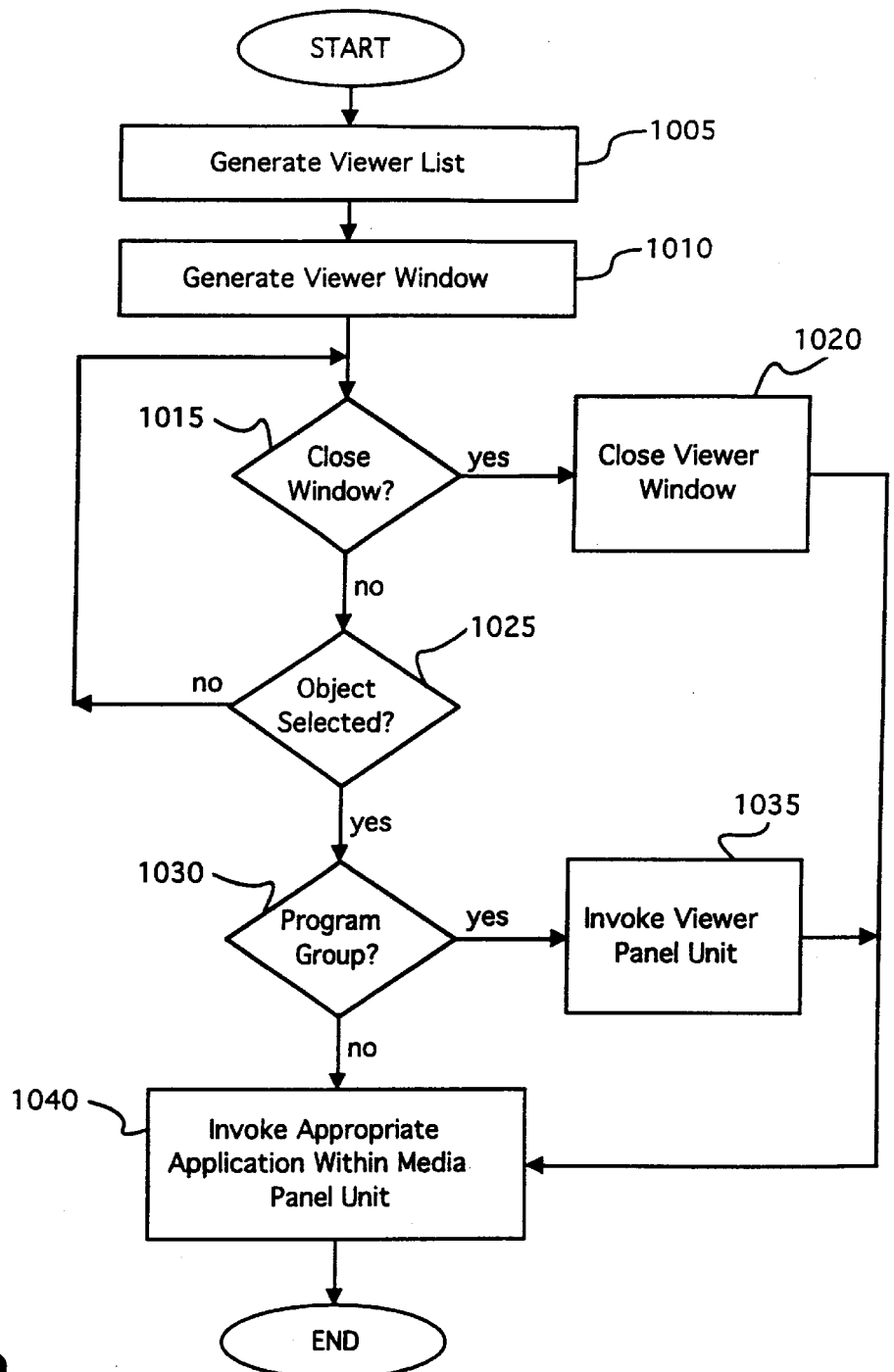
FIG. 10 is a flowchart detailing a preferred method for displaying and manipulating image data sets in accordance with the present invention.

Referring now to FIG. 10, a flowchart of a preferred method for displaying and manipulating image data sets in accordance with the present invention is shown. The preferred method begins in step 1005 with the viewer panel unit 118 generating a viewer list 124 that corresponds to image data sets stored upon a selected data source, in the manner described above. Preferably, the data source is either the camera 108 or the nonvolatile data storage device 102. Next, in step 1010, the viewer panel unit 118 generates the first viewer window 610.

The viewer panel unit 118 subsequently determines in step 1015 whether the first viewer window 610 is to be closed, preferably in response to user input received via the input device 110. If so, the viewer panel unit 118 closes the first viewer window 610, after which the preferred method ends.

If in step 1015 the first viewer window 610 is to remain open, the viewer panel unit 118 determines whether a thumbnail has been selected in step 1025. If no thumbnail has been selected, the preferred method returns to step 1015. In the event that a thumbnail has been selected in step 1025, the viewer panel unit 118 next determines whether the selected thumbnail is a programmed group thumbnail in step 1030. If a programmed group thumbnail has been selected, the preferred method invokes the viewer panel unit 118 to generate another viewer list 124 and viewer window in step 1035, after which the preferred method ends. Preferably, when the viewer panel unit 118 is invoked in step 1035, execution of the viewer panel unit 118 as another task (within the context of a multitasking environment) is initiated.

If a programmed group thumbnail has not been selected in step 1030, the viewer panel unit 118 initiates the execution of the application-specific program instructions within the media panel unit 116 in accordance with the media type associated with the selected thumbnail in step 1040. Following step 1040, the preferred method ends.

Figure 11:
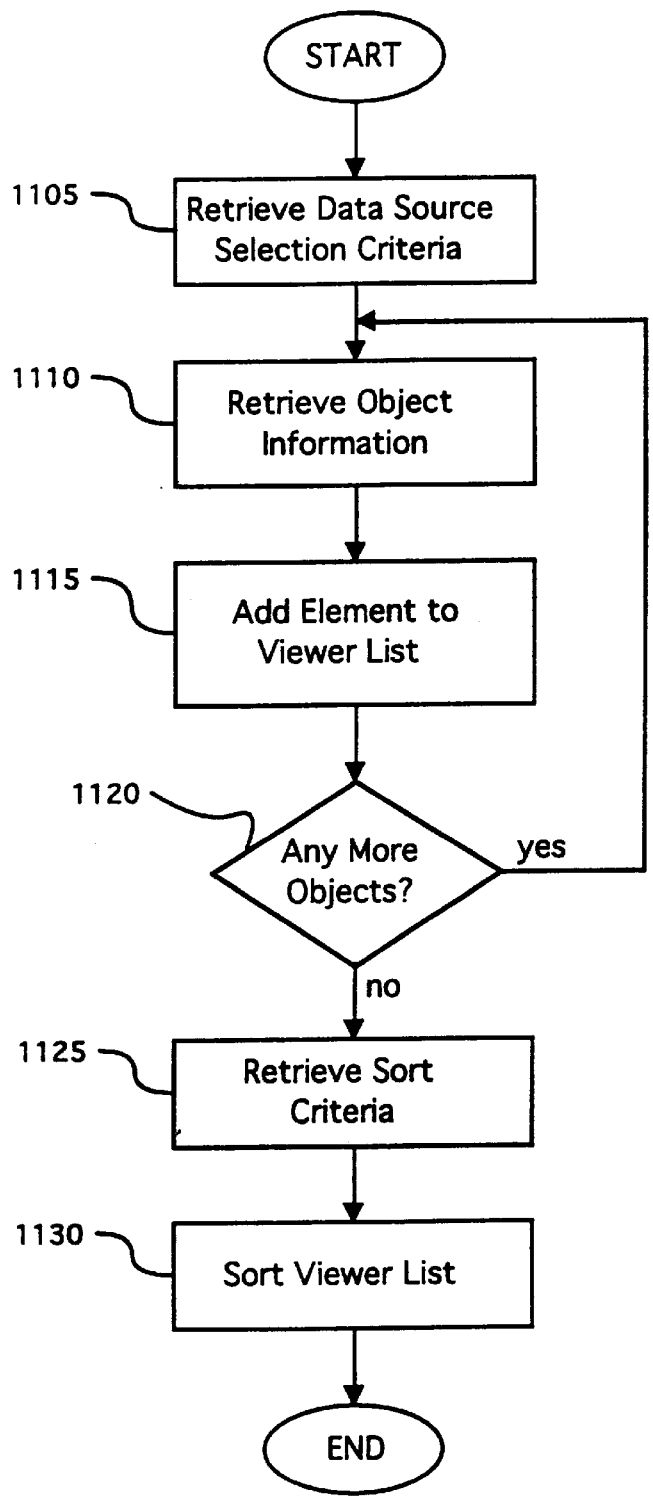
FIG. 11 is a flowchart detailing a preferred method for generating a viewer list of the present invention.

Referring now to FIG. 11, a flowchart of a preferred method for generating a viewer list 124 of the present invention is shown. The preferred method begins in step 1105 with the viewer panel unit 118 retrieving an image data set source selection criterion, which determines where the viewer panel unit 118 initiates a search for image data sets. The selected criterion may indicate a mounted volume, such as the nonvolatile data storage device 102 or the camera 108, or a programmed group located within a mounted volume.

After step 1105, the viewer panel unit 118 retrieves image data set information associated with a first image data set in step 1110. The viewer panel unit 118 then generates a viewer list element 126; adds the image data set information to this viewer list element 126; and adds this viewer list element 126 to the viewer list 124 in step 1115. Following step 1115, the viewer panel unit 118 determines in step 1120 whether additional image data sets within the current image data set source require consideration. If so, the preferred method returns to step 1110.

If no other image data sets require consideration in step 1120, the viewer panel unit 118 retrieves viewer list sort criteria in step 1125, and sorts the viewer list 124 according to the sort criteria in step 1130. After step 1130, the preferred method ends.

Figure 12:
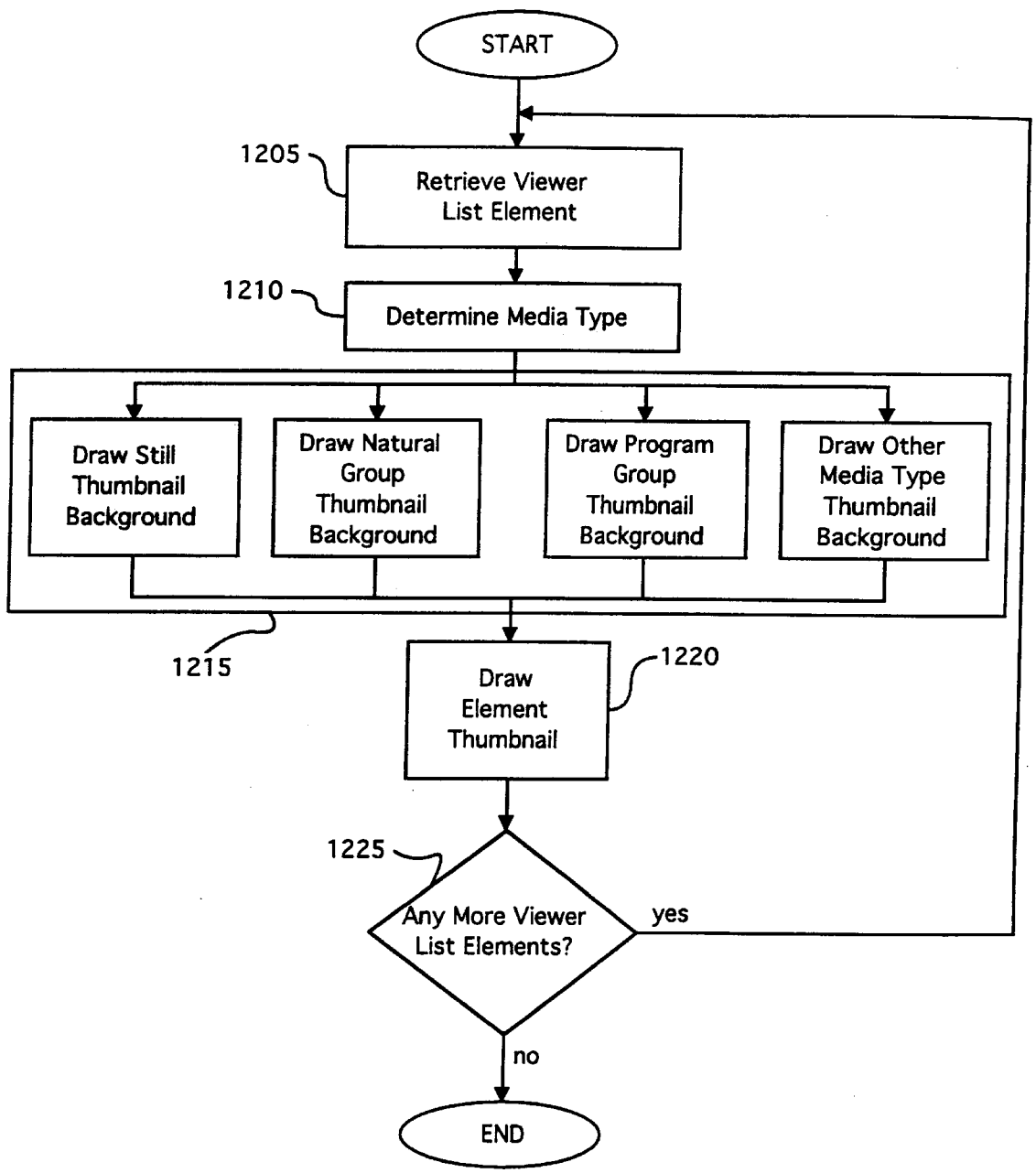
FIG. 12 is a flowchart detailing a preferred method for generating a viewer window of the present invention.

Referring now to FIG. 12, a flowchart of a preferred method for generating a viewer window of the present invention, such as the first viewer window 610 of FIG. 6, is shown. The preferred method begins in step 1205 with the viewer panel unit 118 selecting a first viewer list element 126 within a currently-considered viewer list 124. Next, the viewer panel unit 118 determines the media type associated with the selected viewer list element 126 in step 1210. The viewer panel unit 118 then draws the appropriate type of thumbnail background, if any, upon the display device 106 in step 1215, and draws the thumbnail associated with the selected viewer list element 126 upon the display device 106 in step 1220. The viewer panel unit 118 subsequently determines in step 1225 whether another viewer list element 126 within the currently-considered viewer list 124 requires consideration. If so, the preferred method returns to step 1205; otherwise, the preferred method ends.

While the present invention has been described with reference to certain preferred embodiment, those skilled in the art will recognize that certain described features of the present invention can be substituted, altered or omitted without departing from the spirit and scope of the present invention. For example, if desired, the media panel unit 116 may include additional or alternative applications programs for working with different types of image data sets, for example spatial groups, wherein image data sets are related by relative position such that an application program can "stitch" the images together. Alternatively, still panel 202, movie panel 204 and text panel 206 could be replaced by other commercially available applications programs of similar function. Further, additional common data could be stored in the first data field 302 of one or more viewer list elements 126. The present invention is limited only by the following claims.

What is claimed is:

1. A system for manipulating an image data set comprising:

means for providing said image data set and associated information;

a plurality of panel-based computer program modules, including a linked list data structure having elements with data fields containing common data and a program group reference, for manipulating said image data set, including a view management module that selectively generates a graphical window showing a thumbnail representation of a programmed group that includes a set of references to said image data set, the thumbnail representation comprising data within a data object referenced by the programmed group and depicting a portion of the actual data contained;

a computer program for coordinating said means for providing and said panel-based computer program modules; and a display device for displaying said image data set.

2. The system of claim 1, wherein the thumbnail representation of the programmed group comprises user selected data within a data object referenced by the programmed group.

3. The system of claim 1, wherein the programmed group additionally comprises a reference to another programmed group.

4. The system of claim 1, wherein the graphical window additionally shows a thumbnail representation of a still image.

5. The system of claim 1, wherein the graphical window additionally shows a thumbnail representation of a natural group.

6. The system of claim 5, wherein the thumbnail representation of the natural group comprises user selected data within a data object of the natural group.

7. The system of claim 1, wherein said means for providing is selected from a group consisting of a camera, a data storage device and a data file stored upon a device.

8. The system of claim 1 wherein the thumbnail representation is capable of representing a combination of data types.

9. The system of claim 8 wherein the representation of a combination of data types is user interactive.

10. The system of claim 1 wherein said system is capable of independently receiving each of said panel-based computer program modules.

11. A computer-implemented method for manipulating an image data set comprising the steps of:

providing said image data set and associated information;

using a plurality of panel-based computer program modules for manipulating said image data set, including a linked list data structure having elements with data fields containing common data and a program group reference;

coordinating said computer program modules and said step of providing said image data set;

generating a first graphical window showing a thumbnail representation of a first data object and a thumbnail representation of a first programmed group that includes a set of references to data objects and depicts a portion of the actual data contained;

generating a second graphical window showing a thumbnail representation of a second object and depicting a portion of the actual data contained in response to selection of the thumbnail representation of the first programmed group; and using a display device for displaying said image data set.

12. The method of claim 11, wherein the thumbnail representation of the first programmed group comprises user selected data within a data object referenced by the first programmed group.

13. The method of claim 11, wherein the first data object comprises an image.

14. The method of claim 11, wherein the first data object comprises a natural group.

15. The method of claim 14, wherein the thumbnail representation of the natural group comprises user selected data within a data object of the natural group.

16. The method of claim 11, further comprising the step of invoking an application program in response to selection of the thumbnail representation of the first data object.

17. The method of claim 11, wherein the first programmed group additionally comprises a reference to a second programmed group.

18. The method of claim 17, wherein the second graphical window additionally shows a thumbnail representation of the second programmed group.

19. The method of claim 11 wherein said panel-based computer program modules comprise a view management module that selectively generates a graphical window showing a thumbnail representation of a programmed group that includes a set of references to said image data set, the thumbnail representation comprising data within a data object referenced by the programmed group.

20. The method of claim 19 wherein the thumbnail representation of a programmed group comprises user selected data within a data object referenced by the programmed group.

21. The method of claim 19 wherein the programmed group additionally includes a reference to another programmed group.

22. The method of claim 19 wherein the graphical window additionally shows a thumbnail representation of a still image.

23. The method of claim 19 wherein the graphical window additionally shows a thumbnail representation of a natural group.

24. The method of claim 23 wherein the thumbnail representation of the natural group includes user selected data within a data object of the natural group.

25. The method of claim 19 wherein the thumbnail representation is capable of representing a combination of data types.

26. The system of claim 25 wherein the representation of a combination of data types is user interactive.

27. The method of claim 11 wherein said step of using modules includes independently receiving each of said panel-based computer program modules.

28. The method of claim 11 wherein said step of providing includes selecting a source of said data set and associated information from a group consisting of a camera, a data storage device, and a data file stored upon a device.

29. A system for manipulating an image data set, comprising:

means for providing said image data set and associated information;

panel-based computer program module means for manipulating said image data set, including a linked list data structure having elements with data fields containing common data and a program group reference;

program means for coordinating said computer program modules and said step of providing said image data set;

program means for generating a first graphical window showing a thumbnail representation of a first data object and a thumbnail representation of a first programmed group that includes a set of references to data objects and depicts a portion of the actual data contained;

program means for generating a second graphical window showing a thumbnail representation of a second object and depicting a portion of the actual data contained in response to selection of the thumbnail representation of the first programmed group; and display means for displaying said image data set.

30. The system of claim 29 wherein said panel-based computer program module means comprises a view management module means that selectively generates a graphical window showing a thumbnail representation of a programmed group that includes a set of references to said image data set, the thumbnail representation comprising data within a data object referenced by the programmed group.

31. The system of claim 30 wherein the thumbnail representation is capable of representing a combination of data types.

32. The system of claim 31 wherein the representation of a combination of data types is user interactive.

33. The system of claim 30 wherein the thumbnail representation of a programmed group comprises user selected data within a data object referenced by the programmed group.

34. The system of claim 30 wherein the programmed group additionally includes a reference to another programmed group.

35. The system of claim 30 wherein the graphical window additionally shows a thumbnail representation of a still image.

36. The system of claim 30 wherein the graphical window additionally shows a thumbnail representation of a natural group.

37. The system of claim 36 wherein the thumbnail representation of the natural group comprises user selected data within a data object of the natural group.

38. The system of claim 29 further comprising means for independently receiving each of said panel-based computer program modules.

39. The system of claim 29 wherein said means for providing said image data set is selected from a group consisting of a camera, a data storage device, and a data file stored upon a device.

* * * * *